Oct. 6, 1959     L. HELLER     2,907,554
COOLING TOWER

Filed Dec. 22, 1955     3 Sheets-Sheet 1

INVENTOR.
Laszlo Heller
BY
ATTORNEYS

United States Patent Office 2,907,554
Patented Oct. 6, 1959

2,907,554
COOLING TOWER

László Heller, Budapest, Hungary, assignor to Licencia Talalmanyokat Ertekesito Vallalat, Budapest, Hungary, a Hungarian enterprise Application December 22, 1955, Serial No. 554,831
Claims priority, application Hungary December 22, 1954
1 Claim. (Cl. 257—137)

This invention relates to cooling towers for steam power plants in which the dead steam is condensed in a mixing condenser by the condensate used as cooling water. The condensate which is thereby heated is re-cooled by the atmospheric air in a closed system, the air being compelled over cooling surfaces of heat exchangers.

Since this kind of cooling towers is located outdoors and thus exposed to winds the drawback is experienced that in the case of a strong wind those heat exchange elements over which the air leaves the cooling tower are swept by an air current which was already heated on the opposite heat exchange elements of the sides where the air enters in. Although the wind generally improves the transmission of heat, under the circumstances set out above the output of the cooling tower may be reduced to such an extent, more especially in the case of warm weather, that it no longer suffices to maintain normal operation.

The object of the invention is a cooling tower having means adapted to avoid this disadvantage by preventing repeated flowing of the cooling air through the heat exchange elements which have already been heated.

For this purpose according to the invention the cooling air is delivered between heat exchange elements which form the sides of a cooling tower, said heat exchange elements consisting of conduits for the internal medium, i.e. steam and preferably fins or plates on the conduits to be swept over by the external medium, i.e. air, there being provided guiding walls in the interior of the cooling tower disposed so as to prevent repeated flow through the heat exchange elements of a current of air which has already been heated.

The invention consist further in the matter hereinafter described and claimed.

In the accompanying drawings.

The same reference numbers designate the same components in all the three figures.

Figure 1:
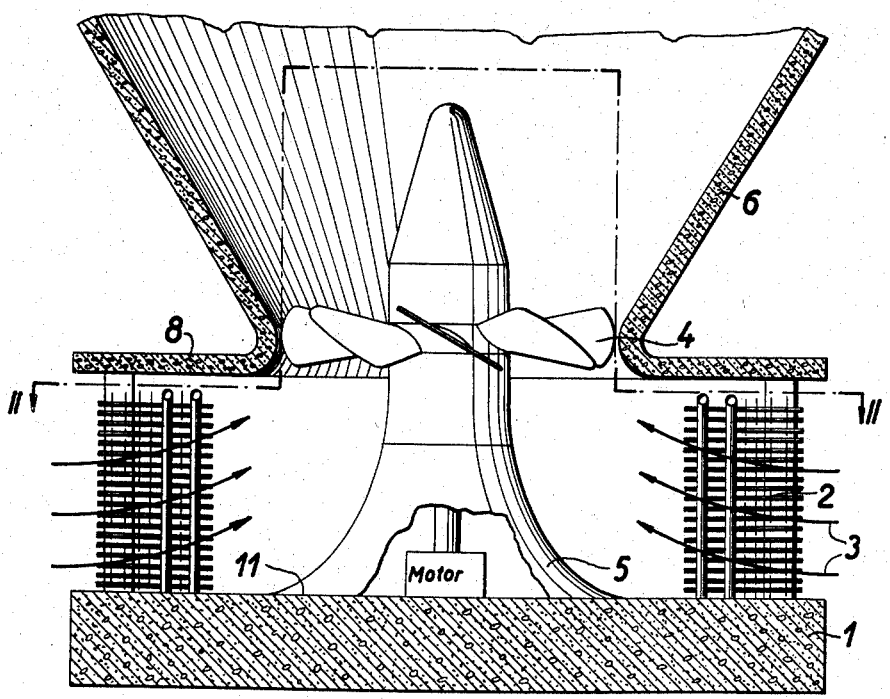
Figure 1 is a vertical sectional view of a cooling tower incorporating the preferred embodiment of my invention.
Figure 3:
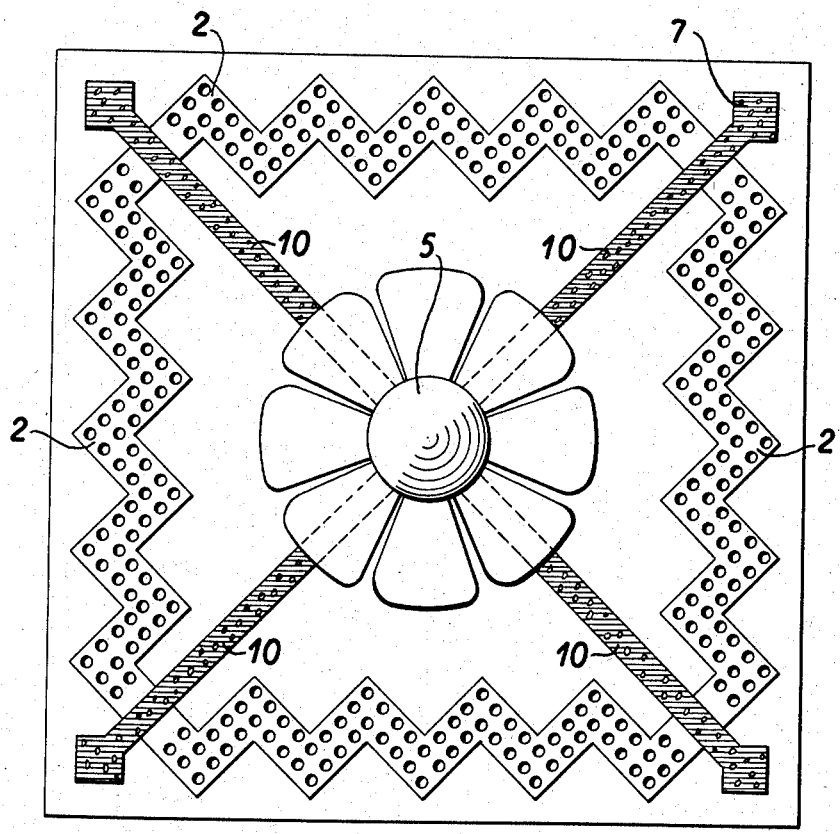
Figure 3 is a sectional view of the cooling tower shown in Figure 1 on line II—II of this figure.

Referring to Figures 1 and 3 of the annexed drawing 1 designates a concrete base on which heat exchange elements 2 are mounted forming a system closed in itself in the interior of which the condensate to be cooled is circulated. Air serving as the cooling means is sucked between those elements in the direction of the arrows 3 by a fan 4 which is built on a supporting column 5 located in the vertical centerline of the tower and is driven by a motor. In order to reduce the outlet waste of the air current so produced, a diffusing tube 6 is provided at the discharge side of the fan.

The cooling tower according to the invention and as illustrated by way of example in Figures 1 and 3 has a square cross-section. 7 designates supporting columns for carrying the superstructure 8 supporting the diffusing tube 6. In order to increase the effective cooling surface, the heat exchange elements 2 are arranged along a zig-zag line as shown in Figure 3.

According to the invention the interior of the cooling tower is divided in four parts by four guiding walls 10, preferably built up of concrete. Each one of the four guiding walls 10 is arranged upright and traverses the interior of the cooling tower in the direction of height as well as in lateral direction, thus reaching from one supporting column 7 or from the heat exchange elements arranged there, up to the supporting column 5 of the fan and from the bottom of the cooling tower up to the lower edge of the fan 4 and the superstructure 8. All the four chambers thus produced are practically completely separated from one another by the perpendicular walls 10.

Figure 2:
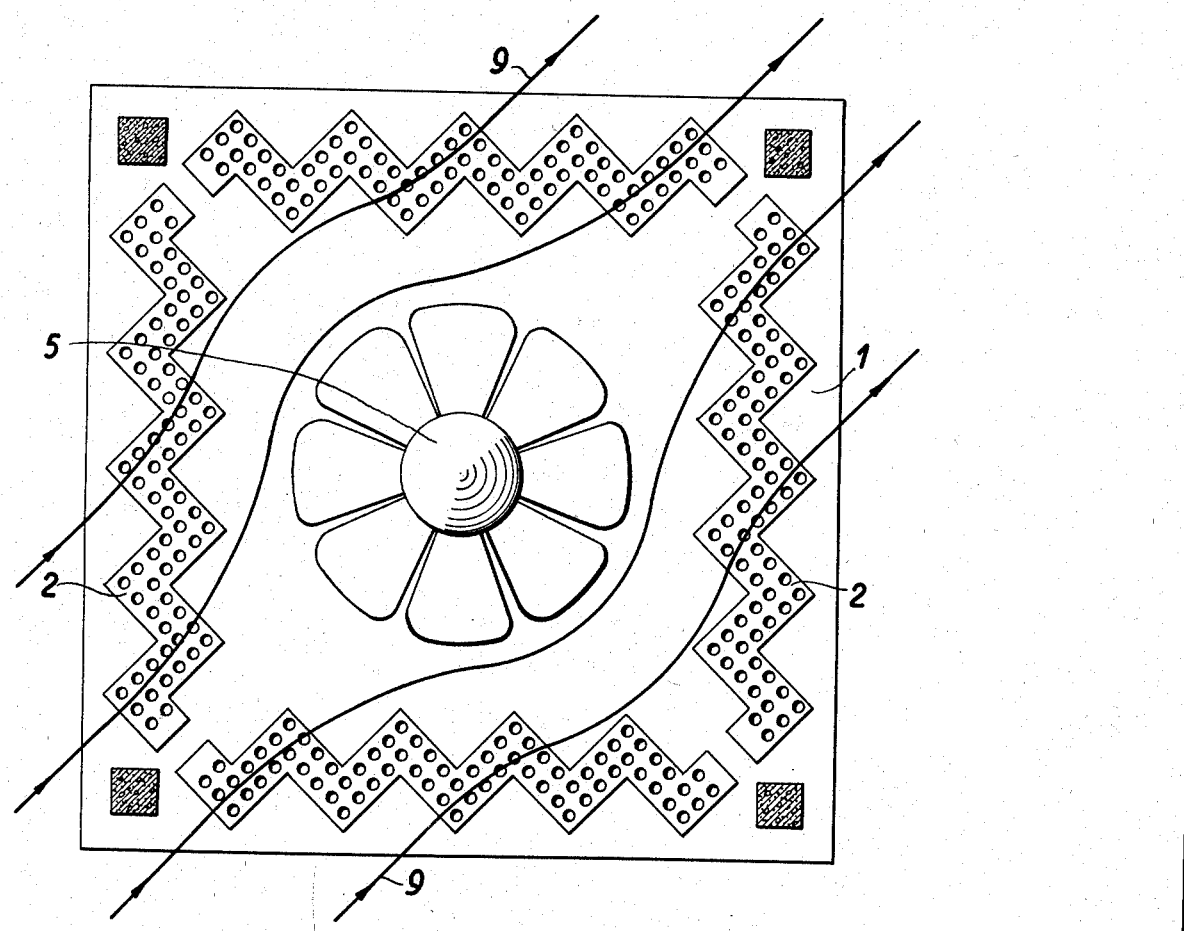
Figure 2 is a sectional view of a cooling tower of known structure.

When there is no wind, the fan draws the cooling air uniformly through all the four sides of the cooling tower and delivers the heated air upwards into the diffusing tube 6. However, especially in the case of a strong wind—if there were no guiding walls 10—the air would flow along the lines 9 of Figure 2 that is to say on two sides into the interior of the cooling tower and on two sides from the interior of the tower to the outside. Although the intensity of the heat transition is increased by the wind, we have the disadvantage in the latter case that those heat exchange elements over which the air leaves the cooling tower are swept by the air current which was already heated on the opposite heat exchange elements of the sides where the air enters in. Although the wind generally improves the transmission of heat, the output of the cooling tower may in the case of a strong wind be reduced to such an extent, more especially in warm weather that it no longer suffices to maintain normal operation.

This disadvantage is removed by the partition walls 10 according to the invention. If the direction of the wind is the same as assumed in Figure 2, the air current coming from the left sweeps only once, namely between the heat exchange elements lying on the left hand side, and over these into the interior of the cooling tower, being then deflected upwards by the two guiding walls 10 lying in the one diagonal and delivered away by the fan.

The cooling tower according to the invention may be of different section than square, for instance circular or polygonal, in which case, according to the existing circumstances and preferably also by taking into consideration the direction of the wind which may prevail locally, more or less than four deflecting guiding walls may be provided.

What I claim is:

A cooling tower for air cooled condensation systems in steam power plants, comprising, in combination, a shaft in said tower for the passage of cooling air, vertical heat exchange elements of right angled zig-zag configuration forming the side walls of said shaft and arranged in a square, a fan disposed on a support located in the vertical center line of the tower above the upper ends of said vertical heat exchange elements, a diffusing tube on the discharge side of said fan, the zig-zag heat exchange elements intersecting at the corners of the tower in substantially square recesses, and diagonal guide walls radiating from said supports along the center line of each square recess and extending to the top of the heat exchange elements.

References Cited in the file of this patent

UNITED STATES PATENTS

| 693,195 | Weightman | Feb. 11, 1902 |
| 1,929,411 | Coey | Oct. 10, 1933 |
| 2,157,070 | Coey | May 2, 1939 |
| 2,247,514 | Mart | July 1, 1941 |
| 2,680,603 | Taylor | June 8, 1954 |
| 2,732,190 | Mart | Jan. 24, 1956 |

FOREIGN PATENTS

| 618,285 | Great Britain | Feb. 18, 1949 |